United States Patent [19]

Polstorff

[11] 4,106,218

[45] Aug. 15, 1978

[54] SIMULATOR METHOD AND APPARATUS FOR PRACTICING THE MATING OF AN OBSERVER-CONTROLLED OBJECT WITH A TARGET

[75] Inventor: Walter K. Polstorff, Huntsville, Ala.

[73] Assignee: The United States of America as represented by the Administrator of the National Aeronautics and Space Administration, Washington, D.C.

[21] Appl. No.: 772,165

[22] Filed: Feb. 25, 1977

Related U.S. Application Data

[63] Continuation-in-part of Ser. No. 590,183, Jun. 25, 1975, abandoned.

[51] Int. Cl.$^2$ .............................................. G09B 9/02
[52] U.S. Cl. ................................. 35/12 C; 35/12 N; 358/104
[58] Field of Search .................... 35/10.2, 11 A, 11 R, 35/12 C, 12 N, 25; 235/151; 273/101.1, DIG. 28; 340/324 A, 324 AD, 324; 358/104, 88; 364/200

[56] References Cited

U.S. PATENT DOCUMENTS

| | | |
|---|---|---|
| 3,439,105 | 4/1969 | Ebeling et al. ................ 35/12 N X |
| 3,507,990 | 4/1970 | Wolff ................................ 358/104 |
| 3,665,408 | 5/1972 | Erdahl et al. ............... 340/324 A X |
| 3,682,553 | 8/1972 | Narinder .......................... 358/88 X |
| 3,729,129 | 4/1973 | Fletcher et al. ...................... 35/10.2 |
| 3,736,564 | 5/1973 | Watkins .............................. 235/151 |
| 3,804,977 | 4/1974 | Driskell ......................... 35/11 A X |
| 3,862,358 | 1/1975 | Wolff .................................. 35/11 A |
| 3,910,533 | 10/1975 | Cheatham ....................... 35/12 C X |
| 3,918,714 | 4/1972 | Ceccaroni ........................ 273/101.1 |
| 3,961,133 | 6/1976 | Bennett ........................ 340/324 AD |

OTHER PUBLICATIONS

Elson, B. M.; "Color T.V. Generated by Computer to Evaluate Space Borne Systems", *Aviation Week & Space Technology*, Oct. 30, 1967, pp. 78–82.

Lockwood, L. W., "Visual Simulators for Moon Men", *Optical Spectra*, Oct. 1971, pp. 32–35.

*Primary Examiner*—Vance Y. Hum
*Attorney, Agent, or Firm*—George J. Porter; John R. Manning; L. D. Wofford, Jr.

[57] ABSTRACT

A servo controlled target replica, and a surface bearing a computer generated line drawing of an object are individually viewed by separate television cameras allowing a two-dimensional composite of the target replica and the object to be displayed on a monitor simulating what an observer would see through a window in a spacecraft. The target replica is coded along one self coordinate axis in such a way that the distance of an elemental area on the target along the axis is capable of being remotely readout by a television camera. A third television camera responsive to the code reads out this information by which the Z-coordinate, relative to the observer, can be calculated, on-line with the scan, for the contents of each picture element of the scene televised by the target camera. The computer calculates the X, Y, Z-coordinates relative to the observer for the contents of each picture element of the scene televised by the object camera; and a comparator compares the Z-coordinates for corresponding picture elements of both scenes in order to determine which camera is to be blanked from the monitor so as to create the illusion that either the target or the object is closer to the observer. The range and aspect of the object is directly controlled by manual inputs to the computer in order to create the illusion of movement of the object relative to the observer and to the target. Realism is further enhanced by creating, on the target, the shadow cast by the object.

20 Claims, 3 Drawing Figures

SIMULATOR METHOD AND APPARATUS FOR PRACTICING THE MATING OF AN OBSERVER-CONTROLLED OBJECT WITH A TARGET

ORIGIN OF THE INVENTION

The invention described herein was made by an employee of the United States Government, and may be manufactured and used by or for the Government for governmental purposes without the payment of any royalties thereof or therefor.

This application is a continuation-in-part of application Ser. No. 590,183 filed June 25, 1975, now abandoned.

BACKGROUND OF THE INVENTION

This invention relates to a simulator by which an observer, viewing both a target and an object under his control, can practice mating the object with the target; and such simulator is hereinafter termed a simulator of the type described.

Space orbital operations currently in preparation for the future involve deployment and retrieval of shuttle de-orbiter payloads relative to an orbiting space station or space vehicle, as well as refurbishing and repair of orbiting vehicles. Such operations will often have to be executed using manipulators controlled by an operator aboard one of the spacecrafts viewing the termination of the manipulator and the target through a window in the craft, or by means of a television link which would also enable operations to be carried out by an earth-based operator.

Maneuvering a manipulator and mating it with the target in a gravity free environment are operations that are different from corresponding operations on earth. In particular, gravity induced torques, which dominantly influence design and performance on earth are absent in space. Furthermore, the mating of the termination of the manipulator with the target must take place with essentially zero velocity in order to minimize a target and manipulator reactive impulse. Such impulse would tend to separate the target from the body carrying the manipulator and therefore must be avoided.

For personnel destined to carry out missions of the type referred to above, it is essential to practice such missions in ground-based simulators to insure proficiency in space. One approach to this training is to construct simulators of the type described using actual or replica models with built-in servo operations to simulate the peculiarities of space performance as noted above. This approach, while having the advantage of visual realism, is very complex and can achieve only limited realism in performance thereby reducing the effectiveness of a training program. Another approach is to employ computer-generated graphics in which both the target and a manipulator, for example, are created on a surface that is supposed to represent the view from a window of a spacecraft or a television monitor. This approach more closely simulates the reactions of the components in a weightless environment but at the expense of visual realism. Complex surfaces familiar to an operator are approximated by polyhedrons in computer-generated graphics and thus appear distorted and hence unrealistic decreasing training effectiveness.

It is therefore an object of the present invention to provide a new and improved simulator method and apparatus of the type described which is less complex in terms of equipment yet realistic in terms of visual perception and equipment performance, thus overcoming substantially all of the deficiencies of the prior art as noted above.

SUMMARY OF THE INVENTION

According to the present invention, a servo controlled target replica, and a surface bearing a computer generated line drawing of an object are individually viewed by separate television cameras allowing a two-dimensional composite of the target replica and the object to be displayed on a monitor simulating what an observer would see through a window in the spacecraft. The target replica is coded along one coordinate axis in such a way that the distance of an elemental area on the target along the axis is capable of being remotely readout by a television camera. The code is by way of a variation in color (i.e., wavelength) or in brightness (or a combination of color and brightness). A third television camera responsive to the code provides information by which the Z-coordinate, (and also X,Y) relative to the observer, can be calculated, on line with the scan, for the contents of each picture element of the scene televised by the target camera. The computer that develops data by which the line drawing of the object is generated also calculates the Z-coordinate relative to the observer for the contents of each picture element of the scene televised by the object camera; and a comparator compares the Z-coordinates for corresponding picture elements of both scenes in order to determine which camera is to be blanked from the monitor so as to render either the target or the object opaque and create the illusion that one or the other is closer to the observer.

The range and aspect of the object is directly controlled by manual inputs to the computer in order to create the illusion of movement of the object relative to the observer and to the target. Greater realism is achieved by creating a shadow of the object on the target. Their mating is visually established by merger of the shadow on the target with the point on the object furthermost from the observer.

The present invention utilizes existing equipment in the sense that servo driven target replicas are well known as is apparatus for generating animated line drawings on a surface. As a consequence of utilizing both a real target and a computer-generated graphical representation of the object, a realistic display of a composite of the target and the object is achieved while also preserving the ability of the target and object to respond to interactions in ways that are peculiar to operation in a weightless environment.

BRIEF DESCRIPTION OF THE DRAWINGS

An embodiment of the invention is illustrated in the accompanying drawings wherein.

DESCRIPTION OF THE PREFERRED EMBODIMENT

Figure 1:
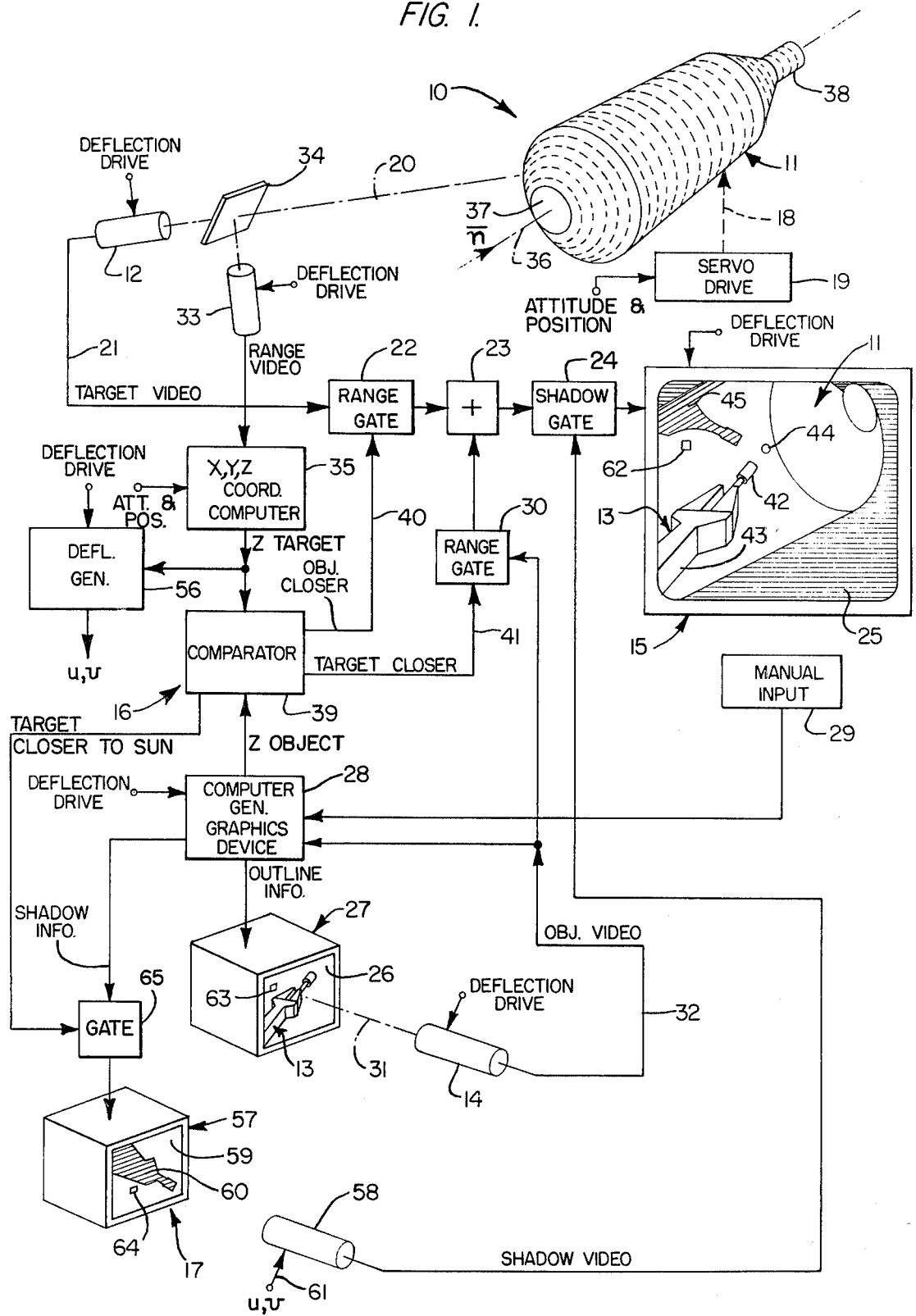
FIG. 1 is a block diagram of a simulator according to the present invention illustrating a typical target and a typical object.

Referring now to FIG. 1, reference numeral 10 designates a simulator according to the present invention comprising a target 11 and an associated target image channel including a first television camera 12; object 13 and an associated object image channel including a second television camera 14; a television monitor 15; coordinate computer 35 and comparator 16; and a shadow generating channel 17. Target 11, which may be an actual space vehicle or a scaled replica thereof, is mounted for three-axis movement at 18 by means of servo drive 19. Translational motions of the target, which are shown in FIG. 1 as being accomplished by servo drive 19, can be, alternatively, simulated by zoom optics on the camera, and/or camera pan or tilt by actual motion of the camera or by modifications in the deflection drive furnished to the camera. For simplicity, all 6° of target motion are performed. by servo drive 19, the input to drive 19 being indicated by the legend "target attitude and position."

Figure 3:
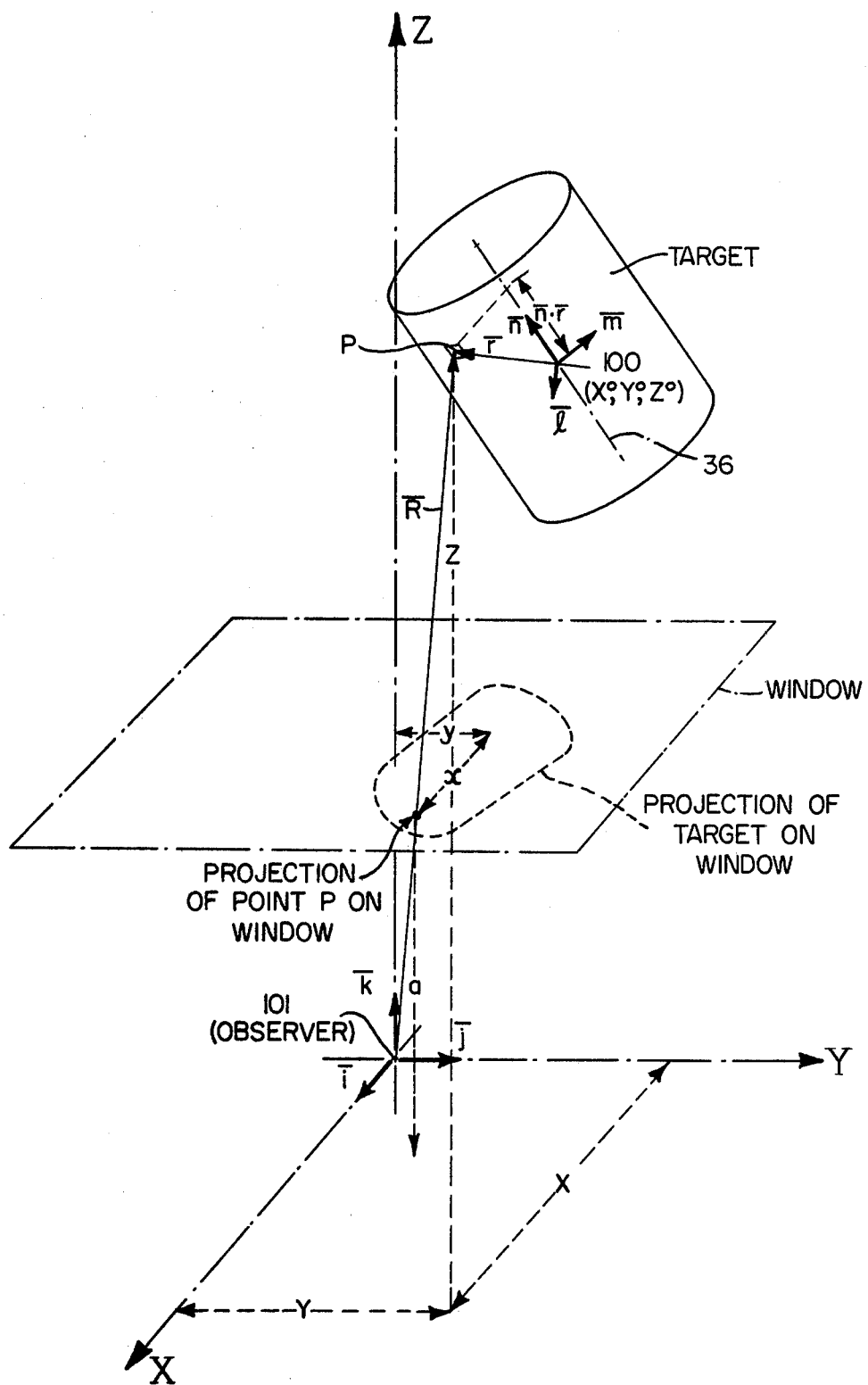
FIG. 3 is a perspective view of the target in relation to the observer coordinate system and is useful in explaining the manner in which the location of a given point on the target relative to an observer is computed as X, Y, Z.

As shown in FIG. 3, the location of the origin 100 of the target coordinate system (i.e., the point to which all points on the target surface are referred for measurement purposes, and in general, the center of mass of the target) is predetermined and given by coordinates $X°$, $Y°$, $Z°$ in the observer coordinate system. As shown in FIG. 1, the longitudinal axis 36 of the target passes through the origin of the target coordinate system. In addition, the attitude of the target relative to the observer is also predetermined so that drive 19 provides target attitude and position data relative to the observer as described below.

Camera 12, which is responsive to the spectral region of light only reflected by the target and not to the light used for coding the target as described below, views the target 11 through dichroic mirror 34 along optical axis 20 and produces a target video signal in line 21 that is applied via normally-open target range gate 22, OR circuit 23 and normally-open target shadow gate 24 to the intensity control of television monitor 15. As is conventional in a closed circuit television system, deflection drive signals derived from a cental source (not shown) are applied to camera 12 and to monitor 15 enabling the scene being televised by camera 12 to be reproduced on screen 25 of the monitor. As indicated above, controlled inputs to servo drive 19 (alone or in combination with corresponding changes in zoom, pan and tilt operation of camera 12) will provide on screen 25 an image of the target changing in range and aspect with respect to the vantage point at which the camera 12 is located. The display on screen 25 thus simulates what an observer would see through a window in an adjacent space vehicle in orbit with target 11 or what a ground-based observer would see by reason of a television-link with the adjacent craft.

Object 13 is shown as a two-dimensional, perspective line drawing of the operating end of a manipulator such as it would appear to an observer through the window of a spacecraft carrying the manipulator. Alternatively, object 13 may be the operating end of an actual manipulator. Preferably, however, object 13 is generated on screen 26 of a display device 27 in accordance with the output of a computer-generated graphical device 28 of the type shown in U.S. Pat. No. 3,736,564. The range and aspect of the object relative to an object vantage point defined by the location of camera 14 relative to screen 26 are determined by observer-controlled manual inputs 29 in a conventional way in order to permit the observer to move the object on screen 26 which is not directly viewed by the observer.

In addition to the second television camera 14, the object image channel includes normally-open object gate 30, summing junction 23 and the shadow gate 24. Camera 14 views the screen 26 along optical axis 31 and produces an object video signal in output line 32 by reason of the deflection drive applied to the camera. Consequently, the scenes televised by cameras 12 and 14 are superimposed on screen 25. To an observer of screen 25, it appears that the target vantage point, which is the location of camera 12, and the object vantage point, which is the location of camera 14, are merged into a single point and both the object and the target are within the observer's field of view.

In the absence of relative range calculation means 16, the target and object would appear to be transparent so that it would not be possible to establish the relative distance from the observer of the object and the target. This ambiguity is resolved by comparator 16 which compares the Z-coordinates (relative to the observer) of the contents of corresponding picture elements in the scene televised by cameras 12 and 14 to the respective vantage points. If the distance from the target vantage point to the contents of a picture element in the scene being televised by camera 12 is greater than the distance from the object vantage point of camera 14 to the contents of a corresponding picture element in the scene being televised by camera 14, then the object will be in the foreground on screen 25 and should be opaque concealing that part of the target lying behind the object. This result is achieved by causing the video signal produced by camera 14 to pass through gates 30 and 24 to the television monitor 15, while, at the same time, blocking the target video signal by closing gate 22. Thus, the contents of the currently scanned picture element in the scene televised by camera 14 would appear on screen 25 to the exclusion of the contents of the currently scanned picture element in the scene televised by camers 12 with the result that the object 13 would be opaque on screen 25 blocking the target 11.

Comparator 16 has a target X-coordinate channel and an object Z-coordinate channel. The target channel includes observer coordinate system computer 35, and a third television camera 33 which views the target 11 from the same vantage point (with identical zoom, pan and tilt) as the first television camera 12 by reason of dichroic mirror 34 causing the optical axis of camera 33 to coincide with the optical axis 20 of camera 12. In addition, target 11 is provided with a coding which for each point on the target surface indicates the distance of the projection of that point on axis 36 as measured from origin 100 of the target coordinate system. As shown in FIG. 3, $\bar{n}$ is the unit vector lying along the axis 36 and $\bar{r}$ is the vector connecting origin 100 to a point $p$ on the surface of the target. Consequently, the scaler $\bar{n} \cdot \bar{r}$ is the distance of the projection of point $p$ on axis 36 measured from origin 100; and such scalar represents the value of the coding for the point $p$. Preferably, the coding is in the form of a variation in brightness along axis 36, the relative value of brightness at a point $p$ having the value $\bar{n} \cdot \bar{r}$. In other words, the brightness of the target changes from one axial end to the other. (See FIG. 1) For example, if the forward end 37 is brightest, and the opposite axial end 38 of the target is dimmest, then the brightness of an intermediate region would have an intermediate value of brightness. Concentric circles 70 shown on the target in FIG. 1 represent bands of constant brightness, the magnitude of which varies along the axis 36 of the target.

The instantaneous output of camera 33, which is functionally related to the brightness of the subject matter of the picture element currently scanned by both cameras 12 and 33, is the quantity $\bar{n}\cdot\bar{r}$ associated with the contents of the currently scanned picture element. Such quantity is termed the "distance component" of the contents of the currently scanned picture element. Such output is converted by computer 35 (in the manner described below) to the previously referred target Z-coordinate for the scanned picture element (i.e., the distance from the target vantage point to the subject matter of the scanned picture element as measured along a normal to the window plane — See FIG. 3). The nature of the dichroic mirror is such that camera 12 is responsive only to the spectral region of the light simulating the sun and illuminating the target. If necessary, a filter can be placed before the camera to achieve the desired response. On the other hand, camera 33 is responsive only to the spectral region of light that constitutes the target coding. Thus, the video signal in the line 21 applied to gate 22 contains information that would, if gate 22 were open, enable the reproduction on screen 25 of the contents of the picture element currently being scanned by camera 12, and the output of computer 35 contains the target Z-coordinate of such contents.

The manner in which computer 35 computes the target Z-coordinate is now described with reference to FIG. 3, it being understood that the amplitude of the output of camera 33 at any instant is the distance component ($\bar{n}\cdot\bar{r}$) of the contents of the picture element being scanned at that instant. If point $p$ is the elemental area on the target being currently scanned by camera 33, FIG. 3 shows that the projection of this point on the axis 36 of the target is $\bar{r}\cdot\bar{n}$ where $\bar{r}$ is the vector from origin 100 to the point $p$, $\bar{n}$ is the unit vector directed along the axis 36, and the symbol "·" means the dot-product of two vectors. In view of the above terminology, it can be seen that the video signal produced by camera 33 at any instant during the scan of its raster provides three pieces of information: the x,y coordinates (i.e., the location on the "window") of the currently scanned picture element $p$, and the scalar quantity $\bar{r}\cdot\bar{n}$ (i.e., the projection of $p$ measured along the axis 36).

By reason of the initial set-up, the following parameters are also known: $a$, which is the distance of the "window" from the observer's eye located at the origin 101 of the observer coordinate system X, Y, X; X°, Y°, Z°, which are the coordinates of the origin 100 of the target; and $\bar{i}\cdot\bar{n}$, $\bar{j}\cdot\bar{n}$ and $\bar{k}\cdot\bar{n}$, which are the components (i.e., direction cosines) of the unit vector $\bar{n}$ in the observer coordinate system and constitute attitude information available from the drive 19.

From inspection of FIG. 3, it can be seen that $x/a = X/Z = (X° + \bar{r}\cdot\bar{i})/(Z° + \bar{r}\cdot\bar{k})$ and
$y/a = Y/Z = (Y° + r\cdot j)/(Z° + r\cdot k)$ (1)

$\bar{r}\cdot\bar{n} = (\bar{r}\cdot\bar{i})(\bar{i}\cdot\bar{n}) + (\bar{r}\cdot\bar{j})(\bar{j}\cdot\bar{n}) + (\bar{r}\cdot\bar{k})(\bar{k}\cdot\bar{n})$ (2)

These are three linear equations with three unknowns, $\bar{r}\cdot\bar{i}$, $\bar{r}\cdot\bar{j}$, $\bar{r}\cdot\bar{k}$, the components of $\bar{r}$ in the observer coordinate system. The direction cosines $\bar{i}\cdot\bar{n}$, $\bar{j}\cdot\bar{n}$, $\bar{k}\cdot\bar{n}$ and the position of the target's center of mass in the observer's coordinate system X°, Y°, Z° are known from the target attitude and position information furnished to servo drive 19. Thus, for each image point x,y it is possible to calculate (based on the readout of $\bar{r}\cdot\bar{n}$ with camera 33) the corresponding unknowns in real time. These equations can be solved, however, only as long as the equations' system determinent D does not go to zero: $D = \bar{x}\cdot(\bar{n}\cdot\bar{i}) + \bar{y}\cdot(\bar{n}\cdot\bar{j}) + \bar{a}\cdot(\bar{n}\cdot\bar{k})$. D can be interpreted as the scalar product of $\bar{n}$, the unit vector of the target body coordinate axis along which the coding for remote readout is conducted and the position vector for the image point in the window. For example, with a field of view of 50° diagonally, and the $\bar{n}$ vector within a cone of ±55° around the Z-axis, D/a will always be more than 0.18. Then, for any point in the window it is possible to determine the components $\bar{r}\cdot\bar{i}$, $\bar{r}\cdot\bar{j}$, $\bar{r}\cdot\bar{k}$, which in turn determines X,Y,Z the coordinates of any visible point of the target in the observer's coordinate system. The comparator 6 compares, as the scan x,y progresses, the target coordinate $Z_t(x,y)$ with the corresponding object $Z_o(x,y)$. The latter is generated in the object coordinate computation as described below.

The arrays used in computer 35 for the real time solution of the three linear equations identified above are based on commercially available components such as multiplying digital/analog converters (e.g., the AD 7522) and analog dividers (e.g., the AD422) both of which are produced by Analog Devices of Norwood, Massachusetts. Implementation of the components to achieve the required real time solution can follow the arrays used for coordinate transformation described in "Hybrid Analog/Digital Technique for Signal Processing Applications" by Thomas G. Horan and Robert Treiber appearing in "Proceedings Spring Joint Computer Conference, 1966."

Computer 28, which generates object 13 on screen 26, is programmed to compute the range of each elemental area of the object relative to the object vantage point. By applying to computer 28 the same deflection signal as applied to television cameras 12, 14 and 33, the computer will produce object range signals synchronised with the target range signals produced by computer 35 enabling the subject matter of the picture elements to the respective scenes being televised by cameras 12 and 14 to be compared in terms of range to the respective vantage points.

Both the target range signals and the object range signals are applied to comparator 39 of range means 16. When a target range signal exceeds an object range signal in amplitude, the object will be closer than the target to an observer viewing screen 25, and a gate signal generated by the comparator is applied to line 40 closing gate 22 and blocking the video output of camera 12. As a result, the video signal in line 32 is passed by gate 30 through shadow gate 24 to monitor 15 enabling the subject matter of the picture element currently scanned by camera 14 to be reproduced on screen 25 to the exclusion of the subject matter of the picture element currently scanned by camera 12. Conversely, when an object range signal exceeds a target range signal in amplitude, comparator 39 produces a gate signal in line 41 closing gate 30 blocking the video signal produced by camera 14. In such case, the subject matter of the picture element currently scanned by camera 12 passes to the monitor to the exclusion of the subject matter of the picture element currently scanned by camera 14. FIG. 1 thus shows a situation in which all parts of object 13 viewed by camera 14 are closer to the observer than the portion of target 11 viewed by camera 12. Object 13 thus appears to be opaque on screen 25 overlying and blocking portions of target 11.

Since screen 25 is two-dimensional, cues must be provided to the observer in order to enable him to judge the relative clearance between the object and the target. One such cue is the perspective of the object and target achieved by reason of the camera 12 and the computer 28; but this is not sufficient. It is essential for the shadow of the object to be shown on the target since mating of the object with the target can be seen to occur when the shadow merges with the portion of the object furtherest from the observer.

Referring to screen 25 in FIG. 1, it can be seen that tool 42 held by the manipulator arm 43 is spaced from a tool receiving lug 44 on target 11 because the tip of shadow 45 of the tool and manipulator arm on the target is spaced from the free end of the tool. Observer operated controls 29 enable computer 28 to generate a changing picture of the manipulator and the tool to simulate movement of the tool towards the target, and, eventually their mating. It is desired to achieve mating at essentially zero relative velocity in order to minimize a reactive impuse that would thrust the target away from the tool. By observing shadow 45 while manipulating controls 29, the operator can practice mating the tool with the lug in order to become proficient in achieving low velocity contact.

Figure 2:
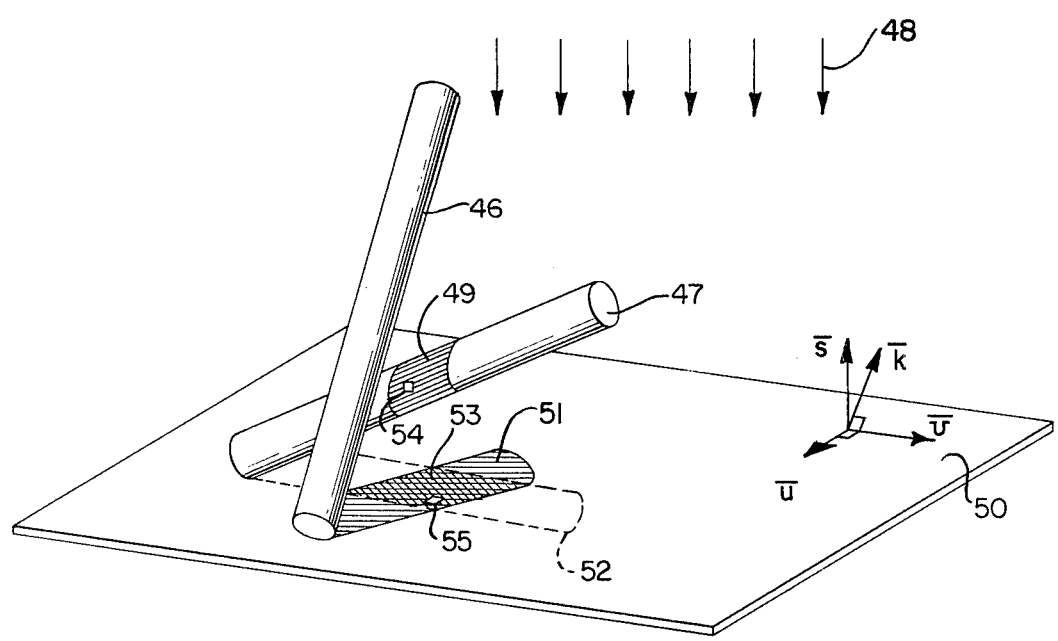
FIG. 2 is a perspective view of a general type of object and target for the purpose of illustrating how the shadow of the object on the target can be determined using a shadow plane perpendicular to the direction of light falling on the object and the target.

In order to generate shadow 45, shadow generating channel 17 is utilized. Before describing the operation of this channel, reference is now made to FIG. 2 which is useful in explaining the theory behind its operation. Referring now to FIG. 2, object 46 and target 47, while actually three-dimensional, are shown in two dimensions as they would appear on a monitor screen using the target and object channel equipment described above. Object 46 is seen to be closer to the observer than target 47 by reason of the blocking of the target by the object. Furthermore, object 46 is seen to be spaced from the target by reason of the location on the target of the shadow 49 cast thereon by the object. Such shadow results from parallel light rays 48.

Assuming there exists a plane 50 perpendicular to the rays 48, the object casts shadow 51 and the target casts shadow 52 on the plane. It can be shown that the shadow 49 on target 47 maps into the area 53 defined by the overlap between shadows 51 and 52. Thus, elemental area 54 having coordinates X,Y,Z relatie to an observer and lying within the shadow 49 maps into elemental area 55, for example, lying within the overlap region 53 in shadow plane 50.

The direction of the solar rays is represented by the unit vector $\bar{s}$. Assuming that the sun is not directly behind the observer (i.e., $\bar{k}$ not parallel to $\bar{s}$), vector product $\bar{k} \times \bar{s}$ defines a direction in the shadow plane. This direction is selected as the direction of the u-axis in the shadow plane (FIG. 2). The unit vector is:

$$\bar{u} = \bar{s} \times \bar{k}/\sqrt{(\bar{s}\cdot\bar{i})^2 + (\bar{s}\cdot\bar{j})^2} = ((\bar{s}\cdot\bar{j})\cdot\bar{i} - (\bar{s}\cdot\bar{i})\cdot\bar{j})/\sqrt{(\bar{s}\cdot\bar{i})^2 + (\bar{s}\cdot\bar{j})^2} \quad (3)$$

The $\bar{v}$-axis is perpendicular to the u-axis; and its unit vector $v$ has the direction of the vector product of $\bar{u}$ and $\bar{s}$.

$$\bar{v} = \bar{s} \times \bar{u}/|\bar{s} \times \bar{u}| \quad (4)$$

$$\bar{v} = [(\bar{s}\cdot\bar{j})(\bar{s}\cdot\bar{k})\cdot\bar{i} + (\bar{s}\cdot\bar{j})(\bar{s}\cdot\bar{k})\cdot\bar{j} - ((\bar{s}\cdot\bar{i})^2 + (\bar{s}\cdot\bar{j})^2)\bar{k}]/\sqrt{(\bar{s}\cdot\bar{i})^2 + (\bar{s}\cdot\bar{j})^2} \quad (5)$$

With the shadow plane defined, together with the coordinate system u,v on the plane, expressions can be obtained for the shadows cast by the object (which is described in the observer coordinate system since the object is attached to the observer's frame) and the shadow cast by the target on the shadow plane. The latter is available because coordinate computer 35 (See FIG. 1) provides the coordinates X,Y,Z of each visible point of the target in real time in synchronism with the scan x,y of the deflection drive. The computer 28 for the object graphics generates the view of the object in the window as well as the shadow of the object in the shadow plane. If a point on the object has observer coordinates X,Y,Z, its shadow has the coordinates $u = (X\cdot\bar{i} + Y\cdot\bar{j} + Z\cdot\bar{k})\cdot\bar{u}$; $v = (X\cdot\bar{i} + Y\cdot\bar{j} + Z\cdot\bar{k})\cdot\bar{v}$. If comparator 39 also determines that the object point is closer to the sun than the corresponding target point, gate 65 opens and the shadow of the object is displayed on the screen 59 of monitor 57. The deflection generator 56 receives the target coordinates X,Y,Z as functions of the scan x,y and generates the deflection coordinates u,v which represent the shadow point of the target point appearing in the window at x,y. The scanning beam of the camera 58 is deflected by u,v $u = (X\cdot\bar{i} + Y\cdot\bar{j} + Z\cdot\bar{k})\cdot\bar{u}$ and $v = (X\cdot\bar{i} + Y\cdot\bar{j} + Z\cdot\bar{K})\cdot\bar{v}$. When it senses the shadow of the object, shadow gate 24 is closed and a shadow of the object on the target is displayed on monitor 15.

If the currently scanned picture element is that element designated by reference numeral 62 on screen 25, the corresponding currently scanned picture element on screen 26 is indicated by reference 63 while the deflection signal produced by generator 56 is such as to cause the scanning beam of camera 58 to impinge upon elemental area 64 of screen 59. Since elemental area 64 is not within shadow 60, the video output from camera 58 has no effect on gate 24 and the video information derived from either target camera 12 or object camera 14 is free to pass gate 24 and into the intensity control circuit of monitor 15. On the other hand, when the currently scanned elemental area of the target is such as to cause the beam of camera 58 to scan into shadow 60, the video output of camera 58 serves to close gate 24 thus blocking any input from either camera 12 or camera 14 and causing a dark elemental area to be produced on screen 25. In this manner, a composite representation of both the object and the target is displayed on monitor 15 with the inclusion of the shadow of the object on the target.

Training an observer to properly mate an object with a target is made more realistic by providing for an independent input to servo drive 19 which is manifested on screen 25 by a target slowly changing in position and aspect relative to the observer. By independently programming servo drive 19 for predetermined position and attitude variations, an observer would appear to be aboard a chase craft in orbit with a target craft.

Finally, camera 14 and monitor 27 can be eliminated by arranging for device 28 to feed information into monitor 15 through gate 30. In such case, object 13 would be generated directly on screen 25 of the monitor.

Alternative to brightness coding along the longitudinal axis of the target, coding by variation in color, or a combination of spectral brightness and color for the coding can be employed. The use of brightness as the measurable stimulus for coding is advantageous because brightness is substantially independent of the aspect of the target and its distance from the camera.

The target can be coded by applying to the same a self-luminant coating which is stimulated to emit light by its own radioactivity or an electroluminescent material that emits light in the presence of an electrical field. The latter material is preferred because the brightness of light emitted can be controlled easily. If the brightness distribution in the direction of the selected body-axis of the target does not correspond to the desired distribution, correction can be effected in the manner indicated below.

The actual brightness distribution over the entire target is measured, elemental area by elemental area, and recorded for later processing. Where the target has a longitudinal axis of symmetry, as, for example, axis 36 of target 11, rotation of the target about such axis is carried out as a spot photometer, focused on the target surface, is moved axially from one end of the target to the other. Other predetermined programs for scanning the target could be used, however. The output of the spot photometer is recorded on magnetic tape, for example, providing a record of the actual brightness of each elemental area of the target. Where the record is in the form of a magnetic tape, the position in the tape of a segment thereof establishes the three coordinates of an elemental area of the target with which the segment is associated, while the information in such segment is the brightness of such elemental area. Segments with the same position along axis 36 are thus identifiable in the tape allowing it to be processed to introduce into each segment having the same position along axis 36, information that is necessary to conform the brightness to the level required for such position.

After the target is scanned with the spot photometer, it is covered with a photographic emulsion under conditions that prevent exposure. The target is then exposed to a light beam whose intensity is modulated by the processed record as the beam scans the target following the same procedure by which scanning was carried out by the spot photometer. In this way, each elemental area of the emulsion is exposed in accordance with the ultimate brightness such area is to have. After exposure in the manner indicated above, the emulsion is developed forming a dye filter that is selectively absorbent in the spectral region utilized for coding of the target thus providing the desired brightness gradient of the target.

The brightness distribution of the target can then be checked by repeating the scanning process with the spot photometer. A repetition of the procedure described above can be carried out if the resultant brightness distribution does not meet the desired requirements.

Camera tubes are limited in their dynamic range which is the range from the maximum signal down to the noise level. Photo statistics impose a natural minimum limit for noise which is approached by some camera tubes. As an example, a resolution of brightness of 1% involves conversion to electrons of more than 10,000 photons/frame, picture element; and in such case, the photoon statistics is the dominant noise source. This translates into a high brightness requirement. An alternate to the required high brightness is to increase the information content by adding color.

Color information is added to the target by coating the same with a color emulsion and exposing the coated target to three light beams of three widely separate colors (e.g., red, gree and blue) yet different and separate from the spectral region for which camera 12 is responsive under control of the processed record. After development of the emulsion, each elemental area of the target will have a color that has three components separable by means of filters. Each component can be one bit of a three bit word that establishes the brightness of an elemental area, thus increasing the resolution of the coding of the target.

What is claimed is:
1. A simulator for practicing the mating of an observer-controlled object with a target comprising:
   a. means for generating a first video signal representative of a scene containing the target as viewed from a target vantage point;
   b. means for generatiing a second video signal representative of a scene containing the object as viewed from an object vantage point;
   c. range means for generating, for each picture element of the scene containing the target, a target range signal representative of the range of the contents of the last-mentioned picture element to the target vantage point, and for generating for each picture element of the scene containing the object, an object range signal representative of the range of the contents of the last-mentioned picture element to the object vantage point;
   d. comparator means for comparing the target and object range signals of corresponding picture elements of the target and object scenes to identify which of said elements has its contents closer to its vantage point;
   e. a television monitor having a viewing screen; and
   f. gate means responsive to the comparator means for controlling the application to the monitor of the first and second video signals whereby both the target and the object are simultaneously reproduced on the screen with the object appearing to block the target when the object is closer to the object vantage point than the target is to the target vantage point.

2. A simulator according to claim 1 wherein the means for generating a first video signal includes a target, and a first television camera viewing the target and producing said first video signal.

3. A simulator according to claim 1 including an auxiliary target slaved to the first mentioned target, and means on the auxiliary target by which its range to the target vantage point is determined.

4. A simulator according to claim 1 including a light source and means for generating the shadow of the object on the target when the object is closer to said light source than the portions of the target whereby mating of a point on the object with the target is observable on the monitor when the distance between said point and the shadow decreases to zero.

5. A simulator for producing a composite image on a display screen comprising:
   (a) a target in the form of a three-dimensional replica or model and provided with a coding that varies as a function of one coordinate of the target;
   (b) a first television camera viewing the target and producing a first video signal;
   (c) means for generating a second video signal representative of a scene containing the object as viewed from an object vantage point;

(d) a target range channel responsive to the coding for generating a target range signal associated with each picture element of the scene containing the target, said target range signal being representative of the range of the contents of the last-mentioned picture element to the target vantage point;

(e) means for generating for each picture element of the scene containing the object, an object range signal representative of the range of the contents of the last mentioned picture element to the object vantage point;

(f) comparator means for comparing the target and object signals of corresponding picture elements of the target and object scenes to identify which of said elements has its contents closer to its vantage point;

(g) a television monitor having a viewing screen; and (h) gate means responsive to the comparator means for controlling the application to the monitor of the first and second video signals whereby both the target and the object are simultaneously reproduced on the screen with the object appearing to block the target when the object is closer to the object vantage point than the target is to the target vantage point.

6. A simulator according to claim 5 wherein said target range channel includes a third television camera for viewing the target from said target vantage point and producing a third video signal related to the distance of the contents of a picture element to a reference point on the target as measured along said one coordinate, and means responsive to the third video signal for producing said target range signals, 7. A simulator according to claim 6 wherein said means responsive to the third video signal is also responsive to the target attitude and the displacement of a reference point on the target from the target vantage point.

8. A simulator according to claim 6 including means for producing, on a surface, the projection of the object on a shadow plane having a predetermined position with respect to both the object and the target, a fourth television camera viewing said surface, means for causing the currently scanned picture element of the scene televised by the fourth camera to be that element constituting the projection on the shadow plane of the picture element of the scene televised by the first television camera, and means to blank the video input to the television monitor when the scan of the fourth television camera is within the projection of the object and when the target is between the shadow plane and the object.

9. A simulator according to claim 6 including observer-controlled means for changing the aspect and range of the object relative to the object vantage point.

10. A simulator according to claim 5 wherein the means for generating a second video signal includes an object and a second television camera viewing the object and producing said second video signal.

11. A simulator according to claim 10 wherein the object is provided with a coding that varies as a function of one coordinate thereof and the range means for determining the range of the object is responsive to said coding for generating an object range signal for each elemental area of the object, each object range signal being representative of the distance from the object vantage point to the elemental area of the object with which it is associated.

12. A simulator according to claim 5 wherein the means for generating a second video signal includes computer generated graphic means for generating a two-dimensional perspective display of the object and a second television camera viewing said display for producing the second video signal, the object range signal being generated by the computer generated graphic means.

13. A simulator according to claim 12 including means independent of the observer for changing the aspect and range of the target relative to the target vantage point.

14. A simulator according to claim 5 wherein the target coding is a variation in brightness along said self-coordinate.

15. A simulator according to claim 5 wherein the target coding is a substantial linear variation in spectral brightness along said self-coordinate.

16. A simulator according to claim 5 wherein the target coding is a variation in color along said self-coordinate.

17. A simulator according to claim 5 wherein the target coding is a variation in both brightness and color along said self-coordinate.

18. A simulator according to claim 5 including a computer for producing an object signal representative of the object as viewed from an object vantage point wherein, and means for supplying said object signal to the monitor whereby the scene being televised by the first camera and a representation of the object are superimposed on the monitor screen.

19. A simulator according to claim 5 including a light source and means for generating the shadow of the object on the target when the object is closer to said light source than the portions of the target whereby mating of a point on the object with the target is observable on the monitor when the distance between said point and the shadow decreases to zero.

20. A method for practicing the mating of an observer-controlled object with a target comprising the following steps:

(a) generating on a television monitor a composite view of both the target and the object with the object occluding the target when the object is closer than the target to the viewer;

(b) generating the shadow of the object on the target; and (c) determining engagement of a point on the object with the target by the spacing between said point and the shadow.

* * * * *